Patented July 12, 1938

2,123,336

UNITED STATES PATENT OFFICE 2,123,336

MEAT PROCESSING

Fernand Kabus, Chicago, Ill., assignor to The Angostura Wuppermann Corporation, New York, N. Y., a corporation of New York No Drawing. Application January 29, 1936, Serial No. 61,307

2 Claims. (Cl. 99—159)

This invention relates to meat processing and has for an object the production of improved processed meat products and the provision of an improved process for producing such products.

The invention is based upon my discovery that objectionable results obtained in subjecting meats to so-called quick-curing processes may be overcome through treatment of the products with bitter substances in solution and aromatic substances in solution. I have also discovered that the digestibility of processed meats may be improved by subjecting the meats during the course of preparation of the processed products to the action of bitter and aromatic substances.

In the treatment of meat for the production of sausages, sandwich spreads, meat loaves and similar products, it is customary to subject the meat to the action of a curing compound or formula comprising, for example, a nitrite, salt and sugar, during the course of a grinding or chopping operation. The curing compound, in which the nitrite is the most effective curing ingredient, functions to destroy or suspend the action of germs which normally cause putrefaction of meat. In addition to the desirable destruction or suspension of the action of germs, the treatment of the meat with the curing compound produces several undesirable results among which are included impairment of color, impairment of flavor, burning which results in breaking of the fibre of the meat stock, and a tendency toward destruction of the albumen which constitutes the life of the meat. In order to overcome or mask the objectionable flavor produced by the curing compound or formula, it is customary to add spices to the meat stock, but it is difficult so to select and proportion the spices employed as to overcome the objectionable flavor and, at the same time, develop a highly desirable flavor, and it frequently happens the resulting flavor is hardly more desirable than the flavor sought to be overcome or eliminated.

I have found that the quality of processed meats can be greatly improved and that virtually all destructive and otherwise undesirable or objectionable features of the use of the curing compound or formula can be eliminated by subjecting the meat stock, after treatment with the curing compound or formula, to the action of aromatic bitters. I have found, also, that treatment of the meat stock, after curing and before or after addition of the spices, with aromatic bitters effects a desirable blending of the spices employed and overcomes or neutralizes obnoxious effects obtained heretofore, thus permitting the use of a wider selection of spices and less careful attention to the selection and proportioning of the spices selected. Furthermore, I have found that treatment of the meat stock with aromatic bitters results in the production of more easily digestible processed meats. This latter feature is particularly noticeable and desirable in pork sausage. The aromatic bitters cuts the grease and gives the sausages a very desirable flavor and thus obviates the tendency toward regurgitation so dreaded by people endowed with weak stomachs.

In addition to the advantages mentioned above, the use of aromatic bitters in accordance with the invention results in preservation of the albumen, restoration or healing of the meat fibres, restoration of the natural meat color and improvement in texture. The invention also provides for the production of processed meat products of uniform colors, tastes and textures.

The aromatic bitters employed in processing meat in accordance with my invention may comprise any elixir, tincture, extract or other compound of bitter and aromatic substances. Suitable aromatic bitters containing one or more bitter substances in solution and one or more aromatic substances in solution may be produced for use in practicing the invention in accordance with well-known procedures, as required, or prepared products may be purchased in the open market which affords a choice of many types consisting for the most part of alcoholic solutions of bitter and aromatic substances.

While a wide variety of aromatic bitters may be employed advantageously in practicing the invention, I prefer to employ the old and well-known product sold under the trade name Angostura, and comprising about 45% ethyl alcohol, 190 proof, and 55% blended bitter and aromatic substances.

In practicing the invention, the bitter and aromatic components of the aromatic bitters may be incorporated in the meat stock separately or together at any stage or stages of the processing treatment after treatment of the meat stock with the curing compound or formula. I prefer to blend the solutions of the bitter and aromatic compounds prior to incorporating them in the meat stock and to incorporate them in the meat stock after treatment of the meat stock with the curing compound or formula and after any spices to be added have been incorporated therein.

A complete preferred process of the invention comprises three stages:

1. A curing stage, involving grinding or chopping of the raw meat stock in the presence of the curing compound or formula and in the presence of a cooling agent such as ice to prevent undesirable heating of the meat. This stage or operation effects thorough mixing of the meat stock and curing compound or formula and the production of a substantially cured meat product.

2. A seasoning stage, in which spices are incorporated in the meat stock and thoroughly mixed therewith during continued grinding or chopping. At the conclusion of this stage or operation, the curing compound or formula and the spices have been thoroughly incorporated in the meat stock and a smooth, substantially homogeneous product has been formed.

3. A restoring or modifying stage in which aromatic bitters is added to the product of the second stage to overcome the objectionable results of the first and second stages and to modify the color, flavor and texture of the product. The aromatic bitters is preferably mixed with the meat stock until a substantially homogeneous product has been formed. Mixing may be accomplished in any suitable manner. Preferably, mixing is accomplished by continuing the grinding or chopping treatment.

The addition of the aromatic bitters after treatment of the meat stock with the curing compound or formula and the spices is preferable because the action of the bitters is counteracted to some extent by unincorporated components of the curing compound and unincorporated spices. Furthermore, the smooth, homogeneous product resulting after curing and incorporation of the spices is more receptive to the aromatic bitters and smaller amounts added at this time produce better results than much larger amounts added earlier.

In practicing the invention, the aromatic bitters may be incorporated in the meat stock in any suitable amounts. Different types of processed meat products require different amounts of aromatic bitters in their production. The amount of aromatic bitters employed will also depend to some extent upon the types and natures of the spices employed.

The following quantities of Angostura bitters per one hundred pounds of meat stock have been employed to produce very desirable sausage products of the types indicated:

| Fluid ounces of Angostura bitters | Type of sausage |
| --- | --- |
| ¾ | Bockwurst. |
| 1½ | Liver sausage. |
| 1 | Pork sausage. |
| 2 | Frankfurters made of bull meat. |
| 1½ | Wieners made of veal and pork. |

In the manufacture of so-called sharp sausages, it is advisable to reduce the quantities of garlic, pepper and salt employed.

In practicing the invention, factors and conditions such as curing compounds and formulas, temperatures, mode of grinding or chopping, added spices and subsequent treatment as by cooking or smoking may be the same as those employed in processing meat by means of processes customarily used heretofore.

I claim:

1. The method of producing processed meat which comprises subjecting raw meat stock to a chopping or grinding operation in the presence of a curing compound, incorporating into the meat stock, after the curing operation is completed, at least one spice, and thereafter mixing with the meat stock at least one bitter substance in solution and at least one aromatic substance in solution.

2. The method of producing processed meat which comprises subjecting raw meat stock to a chopping or grinding operation in the presence of a curing compound, grinding or chopping the meat stock in the presence of at least one spice, after the curing operation is completed, and thereafter grinding or chopping the meat stock in the presence of at least one bitter substance in alcoholic solution and at least one aromatic substance in alcoholic solution.

FERNAND KABUS.